(12) United States Patent
Mencel et al.

(10) Patent No.: US 10,145,586 B2
(45) Date of Patent: Dec. 4, 2018

(54) FLAMELESS HEATER

(71) Applicant: Wacker Neuson Production Americas LLC, Menomonee Falls, WI (US)

(72) Inventors: Dave Mencel, Menomonee Falls, WI (US); Justin Andreas, Grand Haven, MI (US); John Lane, Muskegon, MI (US); Michael Hanson, Muskegon, MI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 360 days.

(21) Appl. No.: 15/000,166

(22) Filed: Jan. 19, 2016

(65) Prior Publication Data

US 2016/0209081 A1 Jul. 21, 2016

Related U.S. Application Data

(63) Continuation of application No. 62/105,541, filed on Jan. 20, 2015.

(51) Int. Cl.
*F24J 3/00* (2006.01)
*F24V 40/10* (2018.01)
(Continued)

(52) U.S. Cl.
CPC .............. *F24V 40/10* (2018.05); *F01N 5/02* (2013.01); *F24H 3/025* (2013.01); *F24H 9/0094* (2013.01);
(Continued)

(58) Field of Classification Search
CPC .. F24J 3/006; F01N 5/02; F24H 3/025; F24H 9/0094; F24H 3/0417; F24D 15/02; F24D 2200/08; F24D 2200/26
See application file for complete search history.

(56) References Cited

U.S. PATENT DOCUMENTS

| 1,390,457 A | 9/1921 | Moran |
| 1,587,984 A | 6/1926 | Pearce |

(Continued)

FOREIGN PATENT DOCUMENTS

| CA | 2 815 986 A1 | 7/2013 |
| DE | 32 32 452 A1 | 3/1984 |

(Continued)

OTHER PUBLICATIONS

MAC Flameless Heaters, MAC 950F Spec Sheet, Before Jan. 19, 2015.

(Continued)

*Primary Examiner* — Alfred Basichas
(74) *Attorney, Agent, or Firm* — Boyle Fredrickson, S.C.

(57) ABSTRACT

A flameless heater includes a diesel engine, a hydraulic or electric load that is powered by the diesel engine thereby generating heat, a heat exchanger that transfers heat to air flowing through the air from the flameless heat source, and possibly other heat exchangers for heating the air flowing therethrough with engine coolant and/or with exhaust gases. The system may be operated to maintain relatively high load on the engine for at least the majority of the time so as to reduce or negate the need for parked regeneration. The system may also control airflow through the system and possibly other system parameters to obtain a given setpoint such as a given discharge air temperature. In one embodiment, airflow through the system is controlled by louvers under the power of an electric motor or other actuator controlled by the system's controller.

26 Claims, 7 Drawing Sheets

(51) Int. Cl.
*F01N 5/02* (2006.01)
*F24H 3/02* (2006.01)
*F24H 9/00* (2006.01)
*F24H 3/04* (2006.01)
*F24D 15/02* (2006.01)

(52) U.S. Cl.
CPC .......... *F24D 15/02* (2013.01); *F24D 2200/08* (2013.01); *F24D 2200/26* (2013.01); *F24H 3/0417* (2013.01); *Y02B 10/70* (2013.01)

(56) References Cited

U.S. PATENT DOCUMENTS

| | | |
|---|---|---|
| 2,764,147 A | 9/1956 | Brunner |
| 3,762,171 A | 10/1973 | Bjorheim et al. |
| 3,777,975 A | 12/1973 | Kofink |
| 3,779,307 A | 12/1973 | Weiss et al. |
| 4,069,972 A | 1/1978 | Hausmann |
| 4,136,824 A | 1/1979 | Kallenbach |
| 4,143,639 A | 3/1979 | Frenette |
| 4,181,098 A | 1/1980 | Kruse |
| 4,192,456 A | 3/1980 | Shields et al. |
| 4,245,593 A | 1/1981 | Stein |
| 4,252,487 A | 2/1981 | Jeppson |
| 4,295,461 A | 10/1981 | Cummings et al. |
| 4,312,322 A | 1/1982 | Freihage |
| 4,346,839 A | 8/1982 | Moser |
| 4,352,455 A | 10/1982 | Moser et al. |
| 4,357,931 A | 11/1982 | Wolpert et al. |
| 4,365,614 A | 12/1982 | Grover |
| 4,386,735 A | 6/1983 | Tholen et al. |
| 4,407,449 A | 10/1983 | Moser et al. |
| 4,419,980 A | 10/1983 | Leary et al. |
| 4,432,493 A | 2/1984 | Moser et al. |
| 4,454,861 A | 6/1984 | Grenier |
| 4,481,934 A | 11/1984 | Stephenson |
| 5,056,502 A | 10/1991 | Eyzaguirre et al. |
| 5,098,036 A | 3/1992 | Bringham et al. |
| 5,341,768 A | 8/1994 | Pope |
| 5,392,737 A | 2/1995 | Newman, Sr. et al. |
| 5,443,208 A | 8/1995 | Potter |
| 5,545,803 A | 8/1996 | Heath et al. |
| 5,567,085 A | 10/1996 | Bruckelmyer |
| 5,819,724 A | 10/1998 | Hybertson |
| 5,820,301 A | 10/1998 | Bruckelmyer |
| 5,895,171 A | 4/1999 | Wiley et al. |
| 5,943,991 A | 8/1999 | Moroi et al. |
| 5,947,376 A | 9/1999 | Moroi et al. |
| 6,186,138 B1 | 2/2001 | Hybertson |
| 6,220,521 B1 | 4/2001 | Bartley et al. |
| 6,413,399 B1 | 7/2002 | Kasevich |
| 6,742,959 B2 | 6/2004 | Strassman |
| 7,942,144 B2 | 5/2011 | Derman |
| 2006/0060156 A1 | 3/2006 | Kuo et al. |
| 2006/0185621 A1 | 8/2006 | Foster et al. |
| 2010/0322713 A1 | 12/2010 | Hegg |
| 2013/0032099 A1 | 2/2013 | Han |
| 2013/0284817 A1 | 10/2013 | Welle et al. |
| 2014/0174691 A1 | 6/2014 | Kamps et al. |
| 2014/0209281 A1 | 7/2014 | Kamps et al. |

FOREIGN PATENT DOCUMENTS

| | | |
|---|---|---|
| DE | 197 11 682 A1 | 11/1997 |
| DE | 197 43 012 A1 | 4/1998 |
| DE | 101 55 210 A1 | 5/2003 |
| EP | 0 034 242 A1 | 1/1981 |
| EP | 0 543 606 A1 | 11/1992 |
| EP | 2 012 426 A3 | 1/2009 |
| WO | 97/13103 | 4/1997 |

OTHER PUBLICATIONS

Conley Max, MA-700 Spec Sheet, Before Jan. 19, 2015.
Rain for Rent, FreezeSentry Flameless Heater FH1000 Spec Sheet, Before Jan. 19, 2015.

FLAMELESS HEATER

CROSS REFERENCE TO A RELATED APPLICATION

This application claims priority under 35 USC § 1.119(e) to earlier U.S. Provisional Patent Application Ser. No. 62/105,541, filed Jan. 20, 2015 and entitled Flameless Heater, the contents of which are incorporated by reference in their entirety.

BACKGROUND OF THE INVENTION

1. Field of the Invention

The invention relates to mobile heaters and, more particularly, relates to so-called "flameless heaters" that generate heat without the use of a burner or other flame that is exposed to the surrounding environment.

2. Discussion of the Related Art

Mobile heaters are used in a wide variety of applications to heat the ground, interior spaces such as tents, or equipment such as an oil well heads or fire hydrants. These systems draw ambient air through a plenum, heat the air, and expel the heated air to the worksite. The most common heaters generate heat using an oil or gas powered burner that generates an open flame. These heaters may be either "direct fired heaters" or "indirect fired heaters." Direct fired heaters heat the air via direct contact with flames from a burner. The heated air and combustion products thus are intermixed. These burners work on the same general principal as a gas grill. In direct fired heat exchangers, exhaust byproducts exchange heat with ambient air before the exhaust byproducts are exhausted from the system in a separate stream from the heated air. These burners work on the same general principal as a furnace.

However, some applications demand a "flameless" heater, i.e., one that generates heat without the use of an open flame that is exposed to the surrounding environment. These applications include those in which the heater is used in or near an environment containing flammable or potentially explosive materials, such as in gas or oil fields. Flameless heaters typically include an internal combustion engine that powers an electric or hydraulic heater.

Mobile heaters, including flameless heaters, often are powered by diesel engines. Operation of such engines under low load conditions for prolonged periods of time can be detrimental to the extent that such operation can lead to hydrocarbon buildup known as "soot." Soot buildup occurs when unburnt fuel is exhausted out of the engine's combustion chambers and builds up in the engine's exhaust system and valves. The unburnt fuel can accumulate in the engine's Diesel Oxidation Catalyst (DOC) and Diesel Particulate Filter (DPF) and is evident in the form of a dark particulate or oily dust. Soot significantly shortens the life of particulate filters and other engine components, reduces maximum power, and increases emissions.

Soot buildup in engines typically is avoided by periodically implementing a parked or active regeneration procedure. During a parked regeneration procedure, the system is taken off-line as only a small parasitic load is allowed to be applied to the engine, and the engine is run at a relatively high RPM for a period of time sufficient to increase the temperature of the system's exhaust system sufficiently to burn off accumulated soot from the system's exhaust system while fuel is injected into the engine's cylinder during the exhaust stroke. This procedure is performed under control of the engine's electronic control module (ECM), also called the electronic control unit (ECU). The procedure can take 30 minutes or more to complete, necessarily requiring that the machine be taken out of service for at least that period of time. While most machines permit manual override of the parked regeneration procedure, failing to implement the procedure for a prolonged period of time can result in damage to the engine or, at a minimum, the need to replace a relatively expensive diesel particulate filter and diesel oxidation catalyst. An active regeneration procedure also is characterized by the injecting of fuel during the exhaust stroke to burn the excess soot built up in the DPF when the engines ECM determines it is necessary and the exhaust temperatures meet the set criteria. However, an active regeneration procedure is allowed to be performed while the unit is still online and under load. That is, the active regeneration is performed in the background relative to device operation.

Known flameless heaters also are relatively "dumb." That is, they offer little if any versatility in their outputs. They also are incapable of regulating the system to obtain a designated air outlet temperature.

Still another drawback of known flameless heaters is that they require engine oil changes and related maintenance relatively frequently, typically on the order of every two weeks or every 100 to 250 hours of operation. This requirement for frequent maintenance is highly detrimental since heaters of this type often are used in very remote locations in which maintenance is difficult, if not impossible. It would be preferable to provide a flameless heater that could operate for an entire season, i.e., on the order of 1,000 to 3,000 hours or more, between service intervals.

In addition, most flameless heaters exhibit a "heat rise", or a maximum temperature increase of air flowing therethrough, of on the order of 90° F. (32° C.). A relatively low heat rise can be detrimental when the machine is operated in extremely cold climates in which subzero Fahrenheit operation is common. Typical advertised temperature rises are 150-180° F. (66-82° C.). It would be preferable to provide the capability of greater heat rises.

The need therefore has arisen to provide a diesel-powered flameless heater that consistently imposes a sufficient load on the engine to reduce or negate the need for parked or attire regeneration to avoid or mitigate soot buildup.

The need also has arisen to provide a flameless heater that can be reliably operated to output a designated, preferably selectable and/or adjustable, output air temperature.

The need further has arisen to provide a flameless heater exhibiting extended service intervals of at least 1,000 hours, and more preferably, of up to 3,000 hours or more.

The need additionally has arisen to provide a flameless heater with relatively high heat rise.

The need additionally has arisen to provide improved methods of operating a flameless heater.

SUMMARY OF THE INVENTION

In accordance with a first aspect of the invention, one or more of the above-identified needs is met by providing a flameless heater having a diesel engine, a flameless heat source that is powered by the diesel engine, a heat exchanger that transfers heat to air flowing through a plenum from the flameless heat source, and possibly, but not necessarily, other heat exchangers for heating the air flowing therethrough with engine coolant and/or with exhaust gases. The system may be operated to maintain relatively high load on the engine for at least the majority of the time so as to reduce or negate the need for parked regeneration. That load may, for example, be at least 35%. and more typically at least 40%, of the engine's maximum rated load.

The system may also control airflow through the system and possibly other system parameters to obtain a given output set point such as a given discharge an temperature. In one embodiment, airflow through the system is controlled by louvers wider the power of an electric motor or other actuator controlled by the system's controller.

The flameless heater may be a hydraulic heater relying on hydraulic fluid as a heat transfer medium. The hydraulic fluid may be heated by one or more in-line restrictors through which hydraulic fluid is pumped under pressure. Engine load and heating capacity can be adjusted by selecting the number of restrictors through which hydraulic fluid is forced.

The system's heaters or heating elements may be arranged to maximize the available heat rise of air flowing to the system. The entire flameless heater may exhibit heat rise above 150° F. (65° C.) and more preferably of approximately 200° F. (93° C.) In one embodiment, heat rise maximization is achieved by placing a hydraulic fluid-to-air heat exchanger or oil radiator downstream of the system's engine radiator of the system in the direction of airflow through the plenum so that the coldest air is heated by the engine coolant, and the warmer air is heated by the hotter hydraulic fluid. An exhaust gas heat exchanger may, if desired, be provided downstream of the oil radiator, permitting the air to be heated still further by the relatively hot exhaust gases.

The system components may be designed to provide service intervals of over 1,000 hours, and more typically of the order of 3,000 hours, hence permitting the system to be used for an entire season in most applications. System characteristics that provide the desired relatively long service interval include one or more of a relatively large oil sump, high engine oil filtration capacity, a high-volume hydraulic fluid tank, and high hydraulic fluid filtration capacity.

A method of operating a flameless heater so as to achieve one or more of the benefits discussed above also is provided. The method may include, for example, controlling the engine, the heat source, and airflow through the plenum so to consistently maintain the engine at a sufficiently high load so as to avoid the need for parked regeneration to avoid soot buildup.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
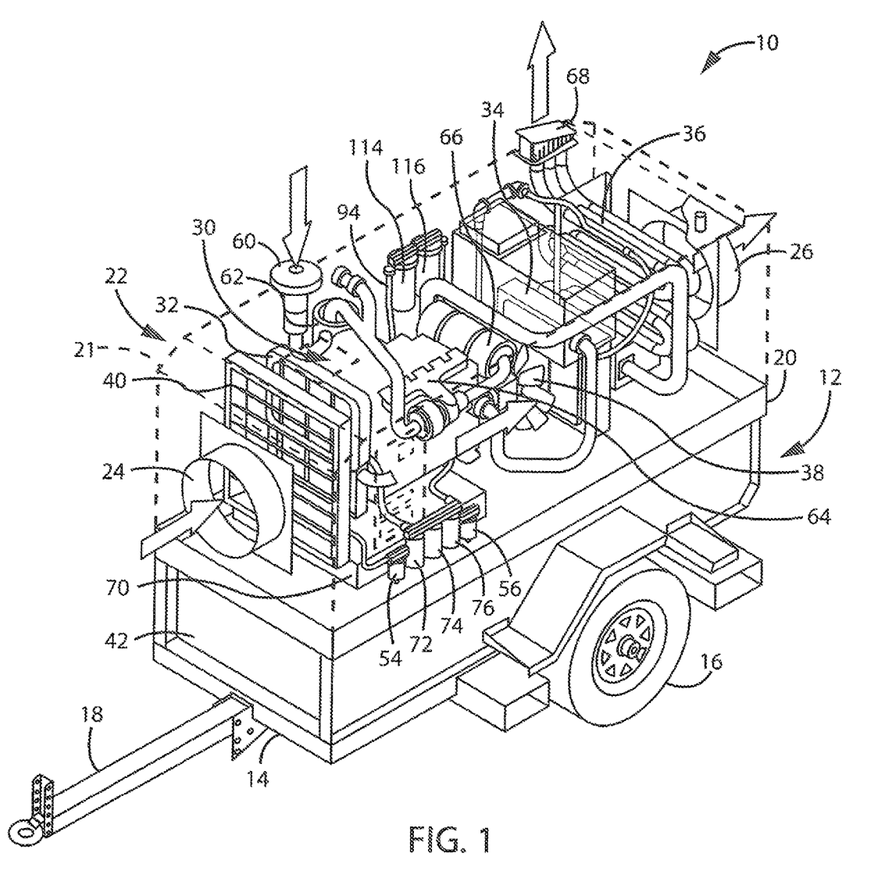
FIG. 1 is a partially cutaway, somewhat schematic perspective view of a flameless heater constructed in accordance with an embodiment of the invention.

Referring to the drawings and initially to FIG. 1, a flameless heater 10 constructed in accordance with an embodiment of the invention is illustrated. The flameless heater 10 is mounted in a mobile trailer 12 so as to be towable to remote worksites. The trailer 12 includes a chassis 14 mounted on the ground by wheels 16 and towable via a hitch 18. The flameless heater 10 is supported on a bed 20 located above the chassis 14. The heater 10 is enclosed in a casing or enclosure 21 defining a plenum 22. The plenum 22 has an ambient air inlet 24 located at the front of the enclosure and a heated air outlet 26 located at the rear of the enclosure. A duct (not shown) may be attached to the heated air outlet 26 to direct the heated air to a desired location such as to the interior of a tent or other enclosure or to a particular area of the ground or to a device.

Still referring to FIG. 1, the heater 10 includes a diesel engine 30 and a three-stage heating system, including an engine radiator or coolant-to-air indirect heat exchanger 32, a hydraulic heat exchanger 34, and an exhaust-to-air indirect heat exchanger 36. Air is drawn through the plenum by a fan 38, which may be powered either electrically or mechanically by the engine 30. The fan 38 may be of fixed speed or may be of variable speed depending on engine RPM and/or other factors. Airflow through the system is controlled by a system of adjustable louvers 40 positioned inside the plenum 22 adjacent the ambient air inlet 24. In the present embodiment, airflow is adjustable from a minimum of 1,500 to 1,700 CFM, and more typically of about 1,625 CFM, to a maximum of 2,400 to 2,600 CFM, and more typically of about 2,500 CFM. Louver position is controlled by an electric motor or other actuator 180 (FIG. 3) capable of precisely opening or closing the louvers 40 on a controlled basis, preferably with closed-loop control based on output of a sensor monitoring temperature.

Still referring to FIG. 1, the engine 30 may be any of a number of diesel engines available from any of a number of manufacturers. Depending on the size of the heater 10 and other factors, it may have a horsepower rating of 20 to 300 Hp. One acceptable engine 30 is a 74 Hp engine available from Kubota. The engine 30 is supplied with fuel via a tank 42 located under the bed 20 of the trailer 12. The tank 42 preferably has sufficient capacity to permit the heater 10 to operate for significant periods of time without refueling. A capacity of on the order of 200 gallons (750 liters) is preferred. Fuel transferred from the tank 42 to the engine's fuel injectors (not shown) by a pump 50 (FIG. 2), a fuel line 52 (FIG. 1), and first and second fuel filters 54 and 56.

The engine 30 further includes an air intake system and an exhaust system. The air intake system includes an intake 60 located outside of the plenum 22, an air cleaner 62, and an air intake manifold (not shown). The exhaust system includes an exhaust manifold 64, an exhaust chamber 66, the exhaust heat exchanger 36, and an exhaust stack 68 exiting the top of the plenum 22.

The engine 30 is supplied with lubricating oil that is stored in an oil pan 70 and that is filtered by a system of oil filters. In order to increase service intervals, the oil pan 70 is of a relatively high-capacity, preferably in the order of 20 to 30 gallons (75-112 liters) and more preferably on the order of 26 gallons (100 liters). In addition, multiple oil filters are provided in order to increase the effective service life of the filters. Three such filters 72, 74, and 76 are provided in series this embodiment. A bypass (not shown) is provided around each of the first two filters 72 and 74 in the direction of oil flow so as to permit continued filtration by the downstream filter(s) should the upstream filter(s) become clogged. Each filter 72, 74, and 76 may be a 20 Micron filter. The engine 30 is cooled by the engine radiator 32, which is located between the engine block and the front of the plenum 22. As already discussed, engine radiator 32 also forms an integral part of the system's three-stage heater.

The flameless heat source 34 may comprise any of a number of systems or devices that lack a burner but yet can impart heat to air flowing through the plenum 22. For instance, it is conceivable that the flameless heat source 34 could be an electrical heat source powered directly by the engine 30 or by a generator that is powered by the engine 30. It also could be a hydraulic source relying on fluid shear to heat hydraulic fluid flowing through an impeller-type device. One such device is disclosed in U.S. Pat. No. 5,819,724 to Hybertson, the subject matter of which is incorporated by reference by way of background. In the illustrated embodiment, the flameless heat source includes an oil radiator 34 that acts as a liquid-air-heat exchanger. Radiator 34 receives hydraulic fluid or heat transfer fluid (HTF) that is heated by being forced through one or more restrictors under pressure. One such oil radiator 34 and the associated hydraulic circuit are shown schematically in FIG. 2. Also shown in FIG. 2 are the aforementioned plenum 22, engine 30, louver assembly 40, radiator 32, and exhaust heat exchanger 36.

The hydraulic fluid or HTF supplied to the oil radiator 34 may be any of a number of fluids that can be heated sufficiently by flow through an orifice or restriction to provide the desired heating effect. It also should have a sufficiently low viscosity at low temperatures of on the order of −40° F. (−40° C.) to be pumpable through the system at these temperatures.

Figure 2:
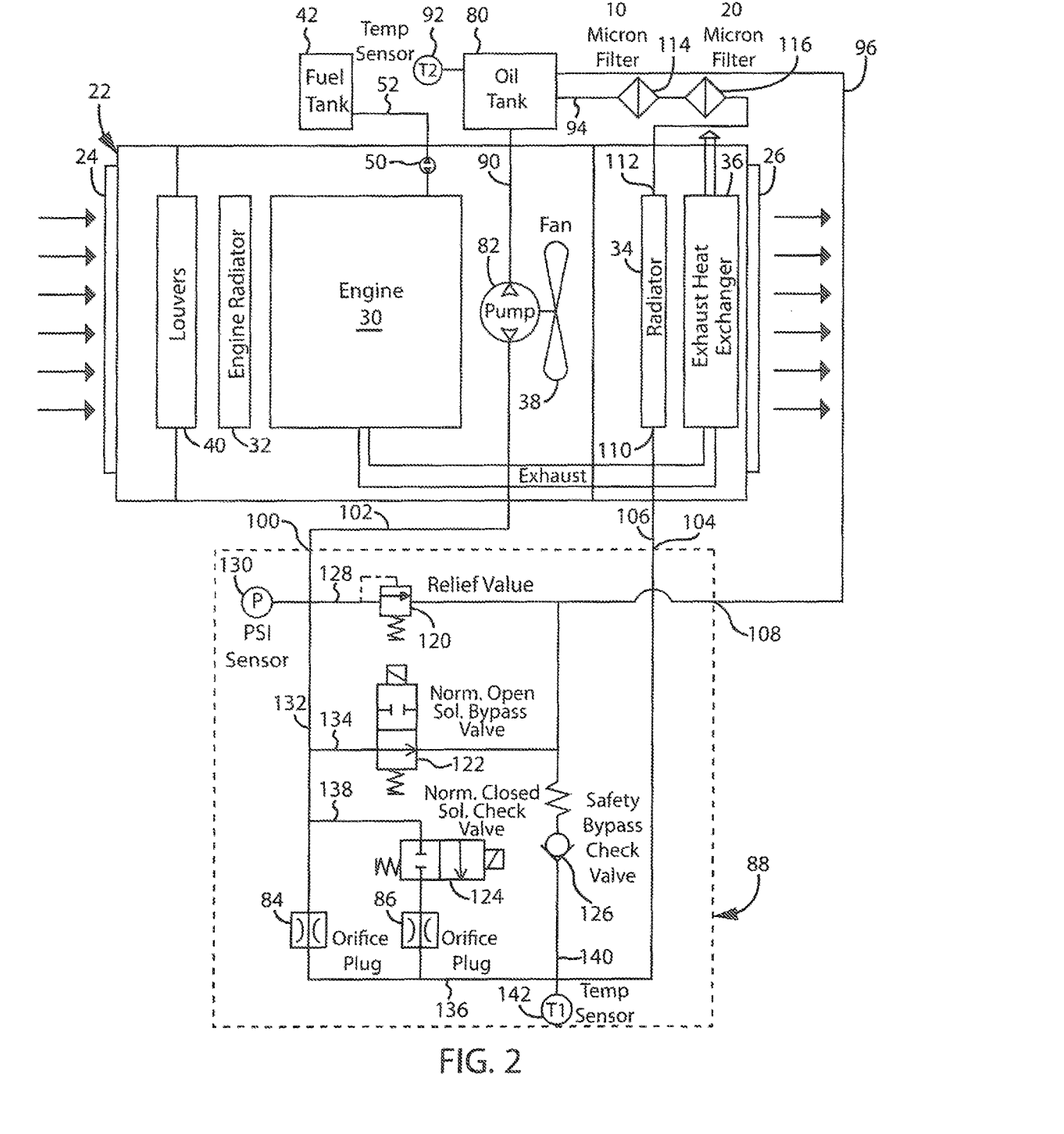
FIG. 2 is a schematic diagram illustrating selected components of the flameless heater of FIG. 1.

Still referring to FIG. 2, when viewed in the direction of airflow through the plenum, the oil radiator 34 is positioned downstream of the engine radiator 32 and, preferably, between the engine radiator 32 and the exhaust gas heat exchanger 36. Positioning the oil radiator 34 downstream of the engine radiator 32 increases the available "heat rise" or capacity of the system to raise the temperature of air flowing therethrough because the fluid in the oil radiator 34 can be considerably hotter than coolant in the engine radiator. Coolant in the coolant radiator typically has a temperature of on the order of 160° F. to 210° F. (71°-99° C.) and more typically of about 175° F. (80° C.). When the system is operating in the high heat mode described below, the fluid entering the oil radiator 34 typically has a temperature of about 180° F. (82° C.). The exhaust gas temperatures entering the exhaust gas heat exchanger 36 are hotter still, typically on the order of 340° F. (171° C.). By placing these heat exchangers in series such as the air is progressively heated by the hottest available heat transfer medium, it has been found that a heat rise above 150° F. (65° C.), and even on the order of 200° F. (93° C.), can be obtained. Hence, for example, air entering the system at −20° F. (−29° C.) can be heated to 180° F. (82° C.).

Still referring to FIG. 2, the hydraulic circuit includes an oil tank 80 storing HTF, a pump 82, first and second restrictors or orifice plugs 84, 86, and a valve assembly 88 that controls HTF flow through the system. The pump 82 is supplied with HTF from the oil tank 80 via a low pressure supply line 90. The tank 80 has a relatively high capacity so as to increase the effective service life of the HTF to the above-mentioned 1,000 to 3,000 hour period. That capacity may be on the order of 20-30 gallons (75-112 liters), and more typically on the order of 25 gallons (100 liters). Fluid temperature in the oil tank is monitored by a temperature sensor 92. Fluid level in the oil tank 80 also may be monitored by an oil level sensor (not shown). Fluid is returned to the oil tank 80 via a return line 94 and a bypass line 96, both discussed below.

Still referring to FIG. 2, the valve assembly 88 includes a high pressure inlet 100 coupled to the pump 82 via a high pressure supply line 102, a first, heated fluid outlet 104 coupled to the oil radiator 34 via a discharge line 106, and a second, bypass outlet 108 coupled to the bypass line 96. The oil radiator 34 has a fluid inlet 110 connected to the discharge line 106, and a fluid outlet 112 coupled to the drain line 94 leading to the oil tank 80. First and second oil filters 114 and 116 are disposed in the drain line 94. The filters 114 and 116 have a capacity of 10 and 20 Microns, respectively.

Disposed within the control valve assembly 88 is a heat source or load formed from first and second restrictors or orifice plugs 84 and 86 positioned in parallel with one another. The control valve assembly 88 controls fluid flow through restrictors 84 and 86 and also includes valves that are designed and controlled to set the pressure at which fluid is pumped to the restrictors 84 and 86 via a high pressure inlet passage 132 coupled to the inlet port 100. The valves also are designed and controlled to provide high heat rise with maximum engine load by causing fluid flow through only the first restrictor 84 and to provide reduced heat with reduced engine load by causing fluid flow through both restrictors 84 and 86. The valves of assembly 88 also can be controlled to bypass both restrictors 84 and 86 to disable the heater and minimize engine load. Toward this end, the valve assembly 88 comprises a pressure relief valve 120 and a two-way/two-position solenoid valve or bypass valve 122, an orifice valve 124, and a safety bypass check valve 126. The pressure relief valve 120 is located in a branch line 128, connecting the inlet passage 132 to the bypass outlet 108. The relief pressure of the pressure relief valve 120 is set at a pressure above the rated pressure of the remainder of the system, or about 3000 psi (20,700 kPa) in the present embodiment.

Still referring to FIG. 2, the valves 122 and 124 control fluid flow through the restrictors 84 and 86 from high pressure inlet passage 132. The bypass valve 122 is located in a branch line 134 that is positioned upstream of both restrictors 84 and 86 and that connects the valve assembly inlet 100 to the bypass outlet 108. When the bypass valve 122 is closed, fluid flows through at least the first restrictor 84, and possibly the second restrictor 86 as well, and thence to a heated fluid outlet passage 136 and to the heated fluid outlet port 104. When the bypass valve 122 is open, fluid in the high pressure inlet passage 132 flows to the bypass outlet 108 with minimal flow through restrictors 84 and 86. The second orifice valve 124 is located in a branch line 138 of the passage 132 leading to the second restrictor 86. When the second orifice valve 124 is closed and the bypass valve 122 is also closed, all fluid flowing through the passage 132 is forced through the first restrictor 84. When the second orifice valve 124 is open and the bypass valve 122 is closed, a portion of the fluid flowing through the passage 132 flows through the second restrictor 86 before being delivered to the heated fluid outlet passage 136.

The safety bypass check valve 126 is located in a branch 140 of the heated fluid outlet passage 136. Opening of the valve 126 connects the outlets of the restrictors 84 and 86 to the bypass outlet 108 and allows flow through passage 128 if the pressure in the branch 140 is above a safe pressure of, for example 150 psi (1035 kPa). Outlet fluid temperature is monitored by a temperature sensor 142.

Figure 3:
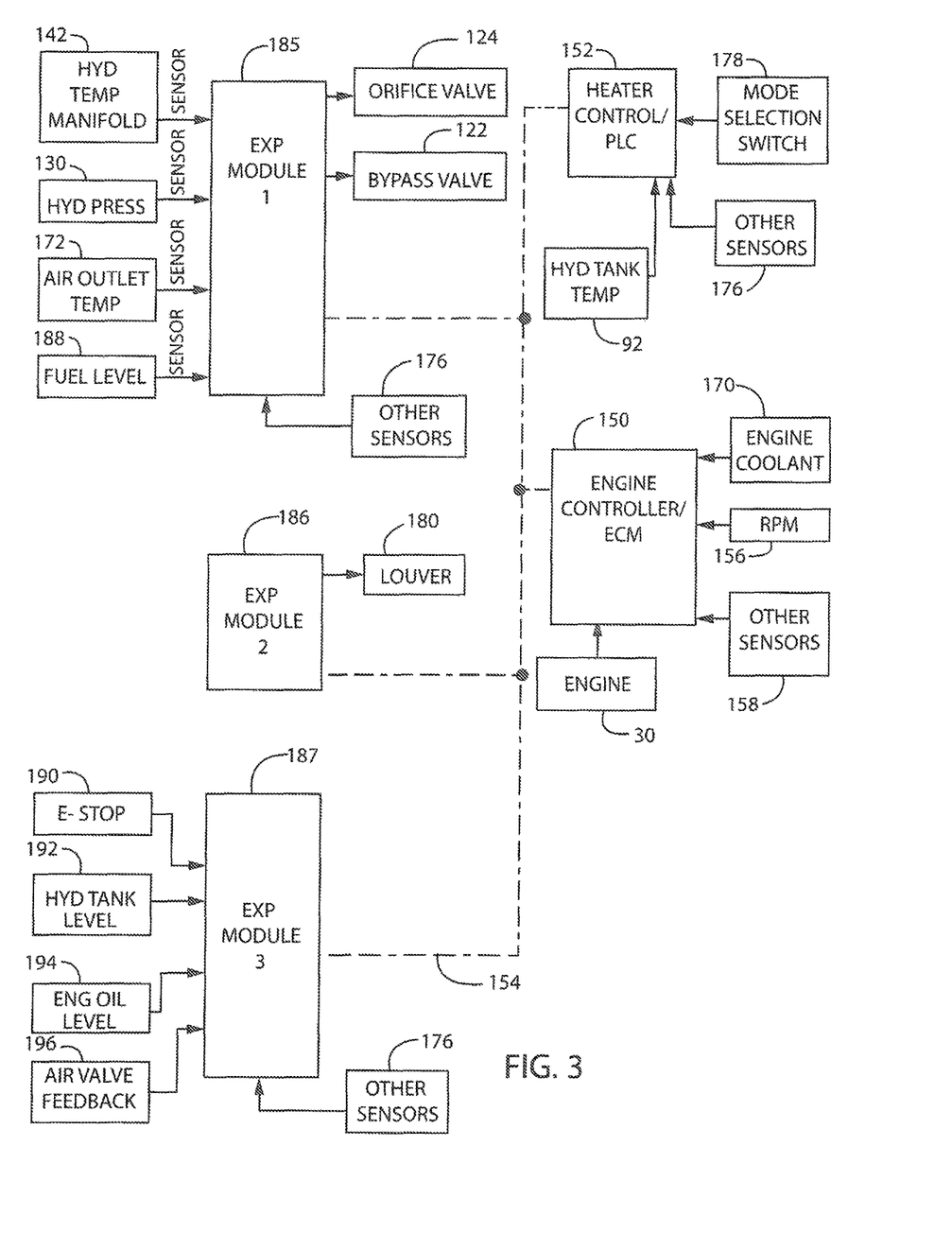
FIG. 3 is a schematic diagram illustrating selected controls and electrical components of the flameless heater of FIG. 1.

Turning now to FIG. 3, electrical controls for the flameless heater 10 of FIG. 1 are schematically illustrated. These controls include first and second controllers 150, 152, and expansion modules 185, 186, and 187, a broadband communications link 154 interconnecting the controllers 150 and 152 and expansion the modules 185, 186, and 187, a number of sensors and controls providing data to the controllers 150 and 152, and a number of components controlled by controllers 150 and 152. Each of the controllers 150 and 152 comprises an electronic control unit or ECU. The first controller or engine controller 150 controls operation of the engine 30. The second controller or heater controller 152 controls the remainder of the flameless heater 10. The broadband communications link 154 may comprise a so-called CAN bus capable of providing two-way communication between the two controllers 150 and 152, expansion modules 185, 186 and 187, and also possibly capable of receiving signals directly from sensors. It is appreciated that additional controllers and modules could be provided that perform some of the functions described herein, as well as additional functions such as gas detection or telemetry.

Still referring to FIG. 3, in the illustrated embodiment, the engine controller or ECU 150 may be supplied by the manufacturer of the engine 30. It receives signals from an engine speed or RPM sensor 156 and possibly other sensor(s) 158 such as a turbo air bypass valve position sensor, an intake air pressure sensor, an intake air temperature sensor, intake or exhaust oxygen concentration sensors, etc. ECU 150 controls the speed of the engine 30 by controlling the engine's fuel injector(s). It also may control other components such as a turbocharger, crank case ventilation valve (CCV), intake and exhaust valves, and other valves or devices that alter the timing, quantity, or quality of fuel or air flow to the engine 30 for emissions controls or other purposes.

Still referring to FIG. 3, the heater controller 152 receives signals from the sensors discussed above in connection with FIG. 2. These sensors include both of the HTF temperature sensors 92, 142, the HTF pressure sensor 130, an engine coolant temperature sensor 170, an air outlet temperature sensor 172 that senses the temperature of air exiting the plenum 22. The controller 152 can calculate a position for the louvers, which has an option for a feedback position. Other sensors 176, such as additional temperature and pressure sensors, also may be provided. A mode selector is programmed into the heater control 152 to allow the operator to select between various operating modes as detailed below. The heater controller 152 relies on signals from these devices and signals received from the engine controller 150 via the CAN bus link 154 to control operation of the bypass valve 122, the orifice valve 124, and the louver actuator 180. The heater controller 152 may control other components 182 as well, such as additional valves. It also supplies control signals to the engine controller 150 for controlling engine operation including setting RPM as well as setting louver position and, in some situations, to shut down the engine 30. It may also receive signals from a fuel level sensor 188. Controller 152 may be operated to close an intake air emergency shutoff valve (not shown) under control of one-stop switch or emergency stop switch 190, a hydraulic tank level switch 192, an engine oil level switch 194, an air valve feedback signal 196, or other sensors/switches, and from the engine controller 150. Many of the signals are transmitted to the CAN bus link 154 via the expansion models 185 and 187.

Figure 4:
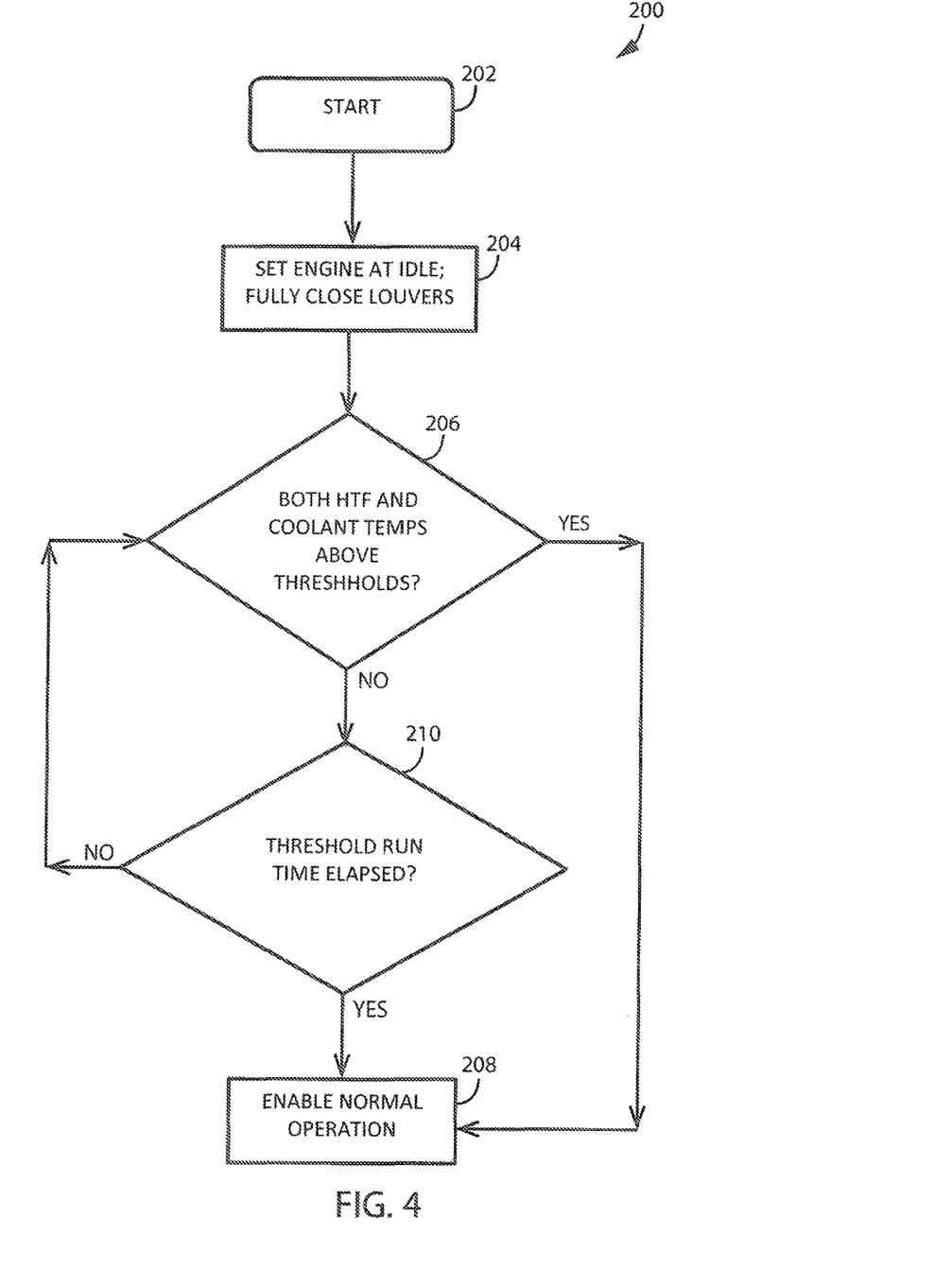
FIG. 4 is a flowchart illustrating operation of the flameless heater of FIG. 1 in a startup mode.

Turning now to FIG. 4, a routine 200 is schematically illustrated for initiating operation of the flameless heater 10 from a cold start condition. The routine 200 may be implemented by the heater controller 152 with input to and from the engine controller 150. The routine 200 proceeds from Start at block 202 to block 204, where the engine 30 is set to run at idle speed and the louver actuator 180 is controlled to set the louvers 40 to their fully dosed position in order to minimize airflow through the system. That idle speed typically will be on the order of 1,000 to 1,500 RPM and is 1,200 RPM in the illustrated embodiment. The bypass valve 122 is open at this time, hence minimizing engine load.

The routine 200 then proceeds to inquiry block 206, where it is determined whether both the HTF temperature as monitored by sensor 142 and the coolant temperature as measured by sensor 170 exceed designated thresholds, which are deemed to be the minimum temperatures at which the system runs acceptably well in all operating modes. These temperatures are 20° F. (−7° C.) and 110° F. (43° C.), respectively, in the present embodiment. If both of these threshold temperatures are met or exceeded, the routine 200 proceeds to block 208, where control of the flameless heater 10 in the commanded operating mode is initiated. If these conditions are not met, the routine 200 proceeds to block 210, where an inquiry is made as to whether a certain period of time has elapsed beyond which it is unlikely that both monitored temperatures are going to increase significantly beyond the sensed levels. At that time limit, it is desirable to override the start up mode to permit system operation under prevailing fluid temperature operating conditions. That time limit is 20 minutes in the present example. If the answer to the inquiry of block 210 is NO, indicating that the minimum temperatures still have not been reached and the maximum elapsed time has not expired, the routine 200 cycles back to the first inquiry block 206. If, on the other hand, the answer the inquiry of block 210 is YES, the routine 200 proceeds to block 208 to enable system operation in the selected operating mode.

In the illustrated example, the flameless heater 10 can be operated in at least three distinct modes of operation via operation of the mode selector switch 178 of FIG. 3. The first two modes employ effectively the same design logic and can be considered a "maximum heat" mode and a "low heat" mode, respectively. Both modes control the engine 30 at a predetermined, constant set point RPM and maintain an output air temperature at a predetermined, constant set point temperature that is preset at the factory and that cannot be adjusted by an operator in the field. In the maximum heat mode, that set point temperature may be, for example, between 170° F. (77° C.) and 190° F. (88° C.), and more typically about 180° F. (82° C.). In the low heat mode, the set point temperature may be between 90° F. (32° C.) and 110° F. (43° C.) and most typically about 100° F. (38° C.). Assuming normal operation with only the first orifice 84 open to fluid flow and hence full engine load, the RPM set point in each mode is designed to maintain sufficient torque on the engine 30 to avoid soot buildup and the need for parked regeneration. In all modes of operation, the system consistently may maintain engine load at or above a desired percentage of the engine's maximum rated load. That percentage may be 35% or, more typically, 40% but ideally should not exceed 85%. "Consistently" in this context means the majority, and more preferably at least 75%, of the time the flameless heater 10 operates post-warm up.

In the maximum heat mode, the RPM set point typically will be between 2,200 and 2,600 RPM and, more typically, approximately 2,400 RPM. In the low head mode, that RPM set point typically will be between 1,700 and 1,900 RPM and, most typically, about 1,800 RPM.

Figure 5:
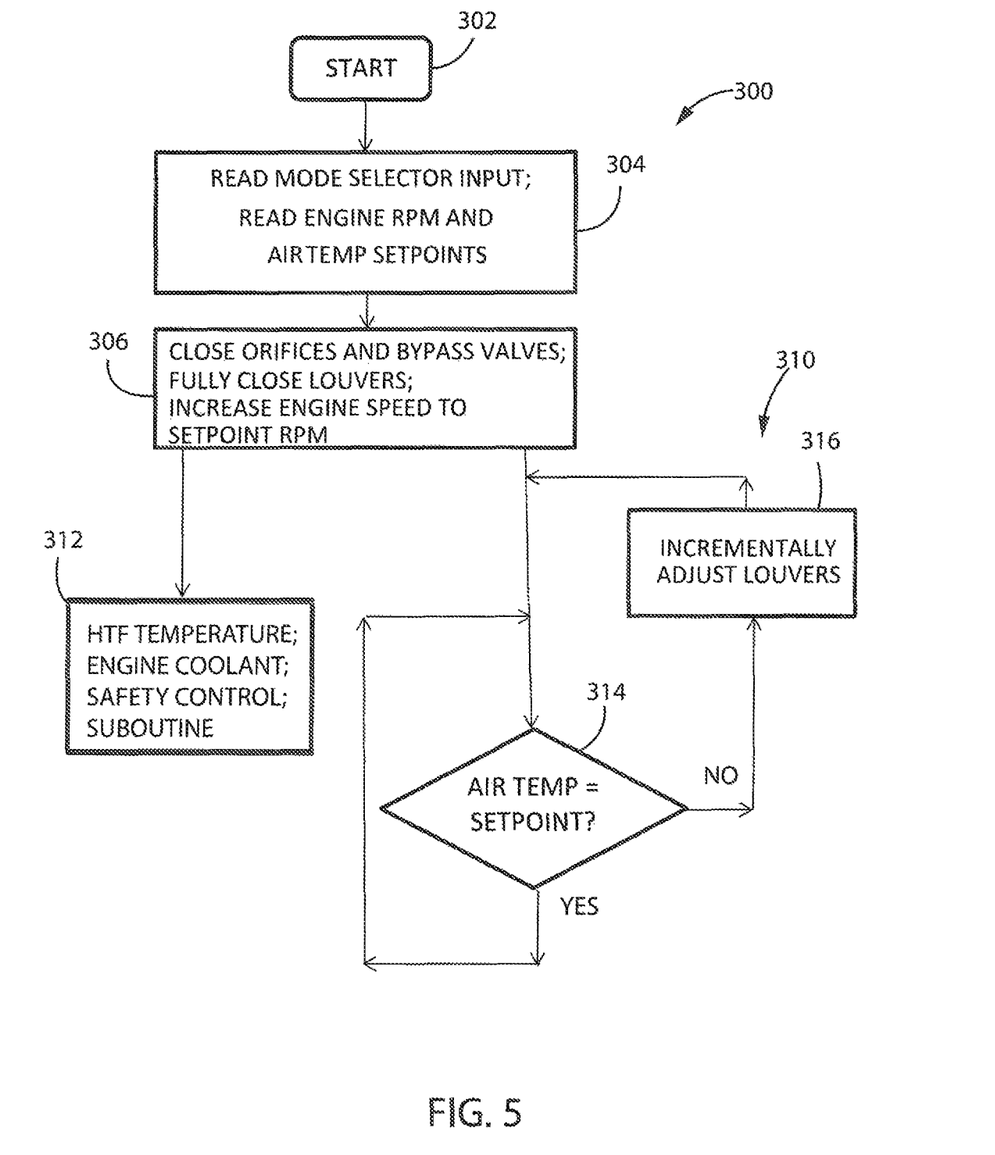
FIG. 5 is a flowchart illustrating operation of the flameless heater of FIG. 1 in a fixed temperature set point mode.

Turning now to FIG. 5, a block diagram of a routine 300 is illustrated that can be implemented by the heater controller 152 to achieve the selected one of the maximum heat mode and low heat mode. The routine 300 proceeds from Start in block 302 to block 304 to determine which mode the operator selected. Prevailing engine speed and outlet air temperature are also read at this time. Upon determining which of those heat modes has been selected, the routine 300 proceeds to block 306 to close both valves 122 and 124, to fully close the louvers 40, and to increase engine speed to the set point speed. As mentioned above, that set point speed is most preferably 1,800 RPM in low heat mode and 2,400 RPM in maximum heat mode. The engine 30 is now operated at relatively high load at the selected RPM given that all fluid is forced to flow through the first restrictor 84. The heater 10 provides maximum temperature rise to the air flowing through the system given that the louvers 40 are in their fully closed position to minimize air flow through the system.

The routine 300 then simultaneously performs two subroutines 310 and 312. The first subroutine 310 controls louver position to maintain the predetermined set point outlet air temperature. The purpose of subroutine 312 is to prevent overheating of the engine (via the engine coolant temperature sensor 170, FIG. 3) as well as the HTF with resultant degradation of fluid quality and, in extreme cases, damage to the flameless heater 10 or its components. The second subroutine 312 can be considered optional in the low heat mode because the chances of HTF overheating in that mode are very remote, at least when the system is operating properly.

Still referring to FIG. 5, the first subroutine 310 begins by proceeding to block 314 where an inquiry is been made as to whether the outlet air temperature as monitored by sensor 172 in FIG. 3 is at or within a tolerance of about 1.0° or 2.0° F. (0.5° C. to 1° C.) of the set point temperature, which in this embodiment is 100° F. (38° C.) in the low heat mode and 180° F. (82° C.) in the maximum beat mode. If so, the inquiry of block 314 is simply repeated, and the louver position will not be altered. Thus, as a practical matter, the louvers 40 will remain fully closed until the outlet temperature reaches and even slightly exceeds the set point temperature, whereupon the subroutine 314 will proceed to block 316 to incrementally adjust (open or close) louver position as is required to maintain the outlet air temperature as measured by sensor 172 at or near the desired set point utilizing a PID loop. The subroutine 310 thereafter will loop between blocks 314 and 316 for so long as it is operated in the desired mode.

By controlling operation to a setpoint outlet air temperature as opposed to a designated volumetric flow rate or other parameter, hysteresis is minimized and better control is achieved. By maintaining the engine 30 under relatively high load under normal operating conditions by suitable selection of engine speed, soot buildup is prevented and the need for parked regeneration is avoided or at least greatly curtailed.

Figure 5A:
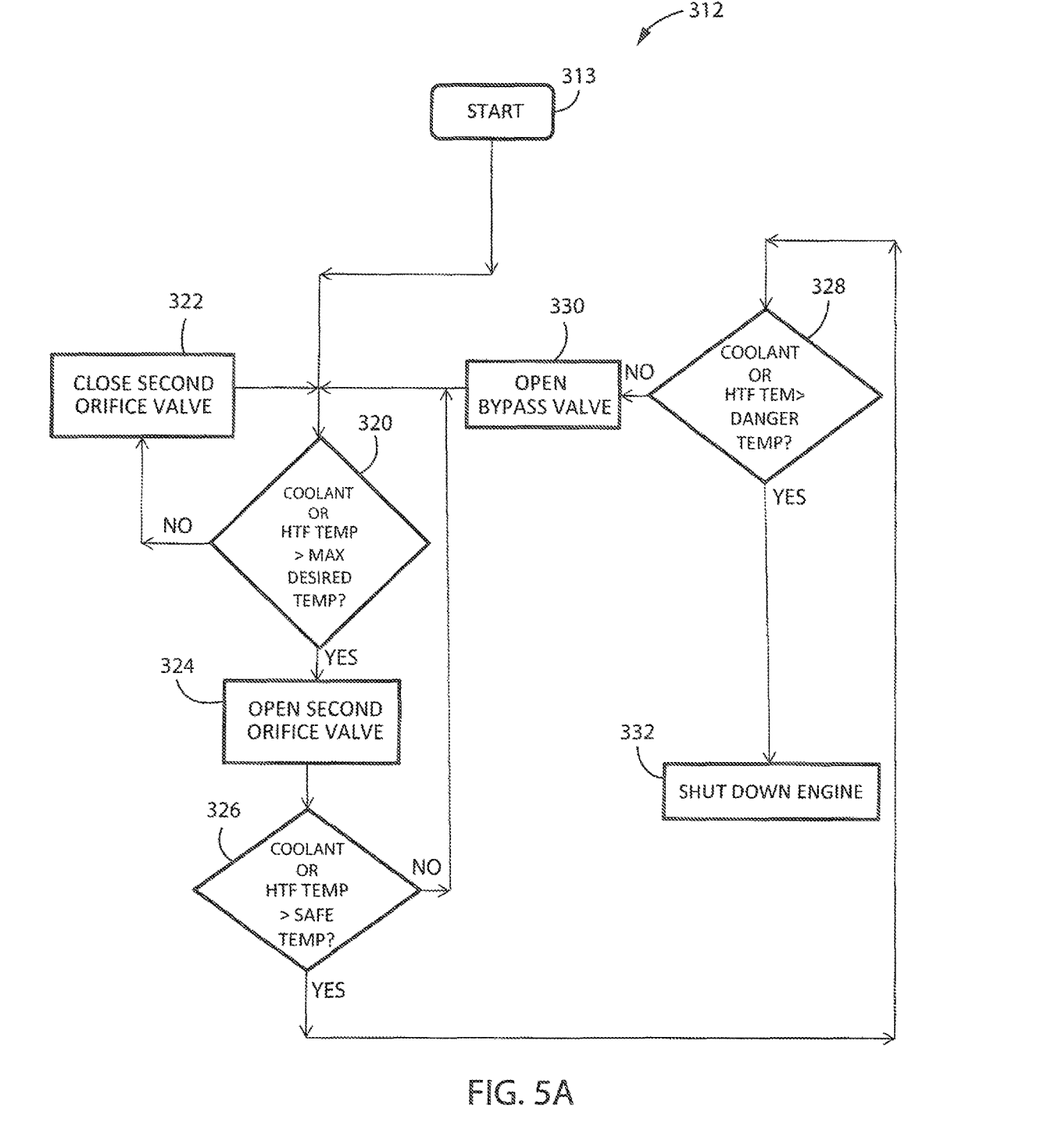
FIG. 5A is a flowchart illustrating a subroutine of the flowchart of FIG. 5.

Referring now to FIG. 5A, second subroutine 312 proceeds from Start in block 313 to an inquiry block 320 that continuously monitors the temperature of the engine coolant as well as the heated hydraulic fluid as detected by sensor 142 in FIGS. 2 and 3. So long as the HTF temperature and the coolant temperature remain beneath levels deemed safe, both the bypass valve 122 and orifice valve 124 remain closed so that all fluid is pumped through the first flow restrictor 84 for maximum engine load and maximum heat generation. The "safe" hydraulic fluid temperature is 181° F. (83° C.) in the case of the particular HTF employed by the present system, but may vary depending on the selected hydraulic fluid and other factors. The "safe" engine coolant temperature may be 203° F. (95° C.). If the answer to the inquiry of block 320 is NO, the subroutine 312 proceeds to block 322 and closes the orifice valve 124 (or confirms that it is closed if the valve 124 is closed at the time of inquiry), and the inquiry of block 320 is repeated. Hence, the system continues to heat HTF solely by forcing it to flow through the first restrictor 84.

If, however, it is determined in block 320 that the measured engine coolant temperature or HTF temperature exceeds the desired level, the subroutine 312 proceeds to block 324 and opens the orifice valve 124 to permit fluid to flow through both orifices 84 and 86. This reduces the load on the engine 30 to approximately half load and also reduces the amount of fluid heating. The subroutine 312 then proceeds to inquiry block 326, which determines whether the measured engine coolant temperature or HTF temperature exceeds a still higher temperature of safe temperature. That temperature may be, for example, 183° F. (84° C.) for the HTF fluid and 220° F. (104° C.) for the engine coolant. If the answer to that inquiry is NO, the subroutine 312 confirms a closed condition associated with bypass valve 329 and returns to the inquiry block 320. If the answer to that inquiry is YES, the subroutine proceeds to block 328 to determine whether the measured engine coolant temperature or HTF temperature exceeds a danger level that could result in system damage. If the answer to that inquiry is NO, the subroutine 310 proceeds to block 330 and opens the bypass valve 122, causing both orifices 84 and 86 to be bypassed and substantially completely unloading the engine 30 and the remainder of the system. The subroutine 312 then returns to inquiry block 320. If, on the other hand, the answer to the inquiry of block 328 is YES, the engine 30 is shut down in block 332. Shut down may entail closing an emergency shut-off valve to terminate air supply to the engine 30, shutting down the fuel pump 50 or otherwise shutting down the fuel supply, and/or shutting down communications to the engine controller 150.

Figure 6:
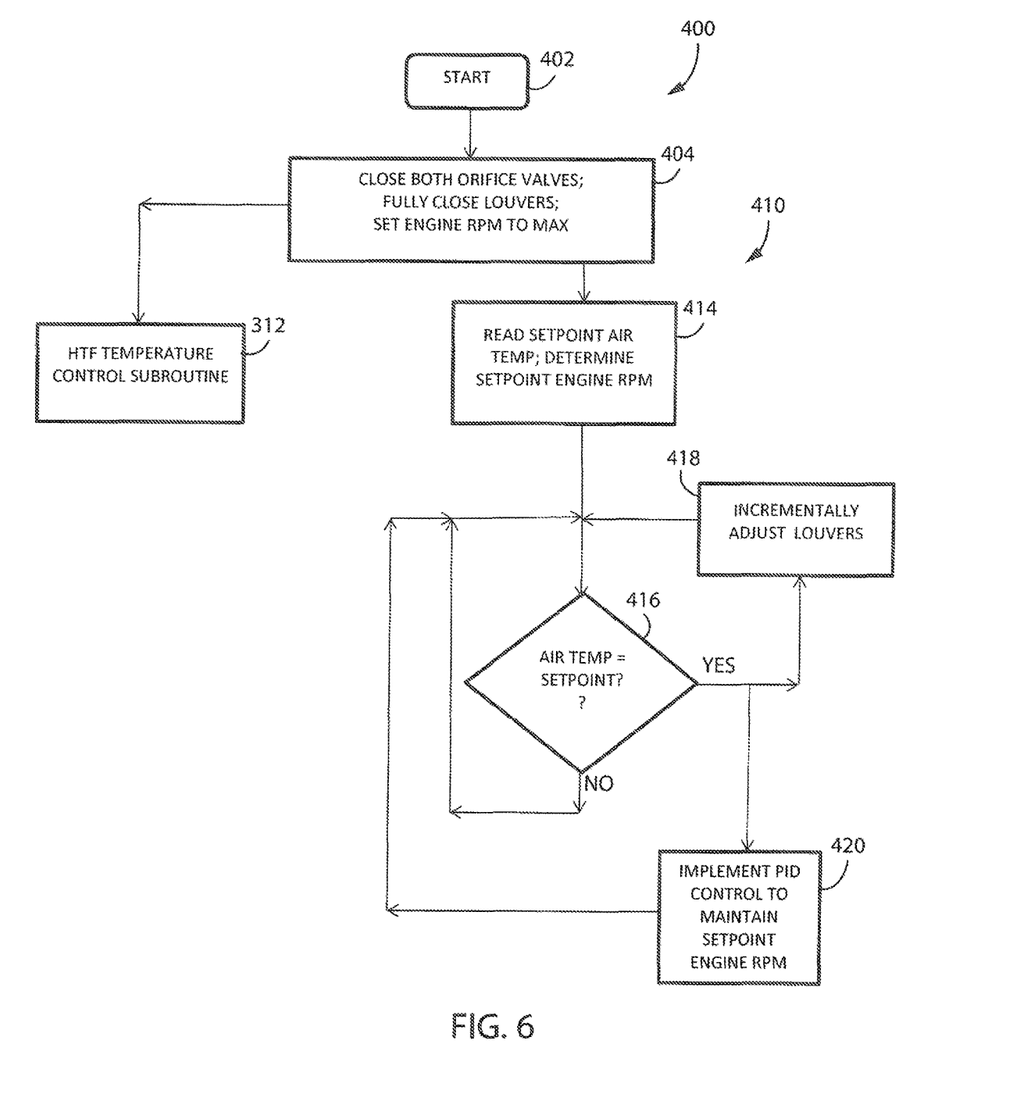
FIG. 6 is a flowchart illustrating operation of the flameless heater of FIG. 1 in a user-settable outlet air temperature set point mode.

As mentioned above, the flameless heater 10 also may be operated in a third mode in which the air outlet temperature is controlled to a setpoint that is not predetermined, but, instead, is settable by the user in the field. That temperature may, for example, range between 100° F. (38° C.) and 200° F. (93° C.). In this mode, the engine 30 is controlled at an RPM that is automatically selected based on the commanded air outlet temperature, and the louvers 40 are adjusted to maintain the commanded air outlet temperature. A routine 400 for implementing this function is illustrated in FIG. 6. As with the other routines, this routine 400 is performed by the heater controller 152 with input to and from the engine controller 150 and the various sensors. The routine 400 proceeds from Start in block 402 upon entry of an outlet temperature command to block 404, where it increases engine speed to maximum (2,400 RPM in this embodiment) closes both valves 122 and 124 so that HTF flows only through the orifice 84, and fully closes the louvers 40 for maximum heating effect. The routine 400 then simultaneously performs two subroutines 410 and 312. The first subroutine 410 controls louver position and engine speed to maintain the commanded setpoint outlet air temperature and an engine RPM that is determined based on that temperature. The second subroutine 312 is the same subroutine for preventing engine coolant temperature or HTF overheating as detailed above in conjunction with FIG. 5A. A description of the second subroutine 312 need not be repeated here.

Still referring to FIG. 6, the first subroutine 410 begins with block 414, where it reads the setpoint air outlet temperature as commanded by the operator. It also determines a steady state setpoint RPM designed to subject the engine 30 to sufficient load at the commanded setpoint temperature to avoid wet stacking. The subroutine 410 then proceeds to block 416, where an inquiry is made as to whether the outlet air temperature as monitored by sensor 172 is within tolerance of the setpoint input by the operator, which in this embodiment is between 100° F. (38° C.) and 200° F. (93° C.). If so, the inquiry of block 416 is simply repeated, and the louver position will not be altered. Thus, as a practical matter, the louvers 40 will remain fully closed and the engine speed will remain at maximum RPM until the outlet temperature reaches the setpoint temperature. When the air output temperature reaches the setpoint temperature, resulting in a YES answer to the inquiry of block 416, the subroutine 410 will proceed to block 418 to incrementally adjust (open or close) louver position as is required to maintain the outlet air temperature as measured by sensor 172 at the commanded setpoint (within a tolerance of, for example, 1° F. (0.5° C.) The subroutine 410 thereafter will loop between blocks 416 and 418 for so long as it is operated in the selected mode. Upon achieving the commanded setpoint temperature, the subroutine 410 also will proceed to block 420 and execute a PID control process to set and maintain the engine RPM at the speed that was determined in block in block 414 with minimal hunting or hysteresis. This same control technique may be used whenever engine speed is adjusted by the system. The subroutine 410 then returns to inquiry block 414.

Other safety controls also could be implemented by some combination of the controllers 150 and 152. For example, the engine 30 could be shut down in the presence of low HTF level alarm, a measured coolant temp above an acceptable value of, for example, 200° F. (93° C.), a low fuel condition, an excessive high pump outlet pressure as monitored by sensor 130 above the relief pressure of the pressure relief valve 120 (that pressure being on the order of 3,100 psi (21,400 kPa) in this example), an inability of the engine to achieve the setpoint RPM, or a controller fault condition.

Still other modes of operation are possible. For instance, a service mode may be provided that is implemental only by service personnel. During operation in this mode, engine RPM, load as set by the valves 122 and 124, and louver position are controlled through a user interface. All outputs can be manually controlled at the heater controller 152.

It also should be noted that most if not all of the concepts discussed herein apply to stationary heaters as well as mobile heaters.

Although the best mode contemplated by the inventors of carrying out the present invention is disclosed above, practice of the present invention is not limited thereto. It is appreciated that various additions, modifications and rearrangements of the aspects and features of the present invention may be made in addition to those described above without deviating from the spirit and scope of the underlying inventive concept. The scope of some of these changes is discussed above.

In addition, as discussed briefly above, the heat source could be an electric heat source instead of or in additional to the hydraulic heat source described above. In this case, the heat source would include a resistive heating element that could either take the place of the oil radiator 34 serving as the system's heater or could heat fluid flowing through a radiator. The scope of other changes to the described embodiments that fall within the present invention but that are not specifically discussed above will become apparent from the appended claims and other attachments.

What is claimed is:

1. A flameless heater comprising:
   a. a diesel engine;
   b. a flameless heat source that is powered by the engine;
   c. a plenum having an ambient air inlet and a heated air outlet;
   d. a heater that receives heat energy from the heat source and that that heats air flowing through the plenum; and
   e. controls that control the engine, the heat source, and airflow through the plenum so as to maintain engine load at or above 35% of a maximum load for the engine for at least 75% of operation time, post warm up, so as to avoid the need for parked regeneration to avoid soot buildup.

2. The flameless heater of claim 1, wherein the heat source is a hydraulic heat source that includes first and second restrictors through which pressurized hydraulic fluid can be selectively forced to generate heat, and wherein the controls include a valve assembly that control fluid flow through first and second restrictors, prioritizing flow through only the first restrictor.

3. The flameless heater of claim 2, wherein the valve assembly is switchable between 1) a first setting in which fluid flows through the first restrictor but not the second restrictor, 2) a second setting in which hydraulic fluid flows through both the first and second restrictors.

4. The flameless heater of claim 1, wherein the heater includes a plurality of heating elements located in series within the plenum in the direction of airflow through the plenum, each successive heating element being hotter than the proceeding heating element.

5. The flameless heater of claim 4, wherein the heating elements include an engine radiator and a hydraulic fluid-to-air radiator located downstream of the engine radiator in the direction of airflow through the plenum.

6. The flameless heater of claim 5, wherein the heating elements further include an exhaust gas heat exchanger located downstream of the fluid-to-air radiator in the direction of airflow through the plenum.

7. The flameless heater of claim 1, wherein the controls control at least one of airflow through the plenum, the engine, the heat source, and the heater to maintain a setpoint discharge air temperature at a designated value.

8. The flameless heater of claim 7, wherein the controls are operable in at least one of:
   a. a first mode in which the setpoint discharge air temperature is maintained at a first temperature that cannot be altered by an operator in the field,
   b. a second mode in which the setpoint discharge air temperature is maintained at a second temperature that is substantially lower than the first temperature and that cannot be altered by an operator in the field, and c. a third mode in which the setpoint discharge air temperature is maintained at a temperature that is selected by an operator in the field.

9. The flameless heater of claim 1, wherein the controls maintain the engine load above at least 35% of a maximum rated engine load.

10. A flameless heater comprising:
   a. a diesel engine:
   b. a flameless heat source that is powered by the engine;
   c. a plenum having an ambient air inlet and a heated air outlet;
   d. a heater that is coupled to the heat source and that heats air flowing through the plenum, wherein the flameless heater exhibits a maximum heat rise in excess of 200° F. (93° C.);
   e. a louver assembly having a plurality of positionally adjustable louvers; and
   f. electronically actuated controls that control a position of the louvers of the louver assembly so to control airflow through the plenum.

11. The flameless heater of claim 10, wherein the heater comprises heating elements including an engine coolant radiator and a hydraulic fluid-to-air radiator located in the plenum downstream from one another in the direction of airflow through the plenum, the a-hydraulic fluid-to-air radiator being supplied with heated fluid from the heat source.

12. The nameless heater of claim 11, wherein the heating elements further include an exhaust gas heat exchanger located in the plenum downstream of the hydraulic fluid-to-air radiator in the direction of airflow through the plenum.

13. A flameless heater comprising:
   a. a diesel engine;
   b. a flameless heat source that is powered by the engine;
   c. a plenum having an ambient air inlet and a heated air outlet;
   d. a heater that is coupled to the heat source and that heats air flowing through the plenum;
   e. electronically actuated controls that control airflow through the plenum and at least one of the engine, the heat source, and the heater to maintain a setpoint discharge air temperature at a designated value; and
   f. a louver assembly comprising a plurality of positionally adjustable louvers, wherein the controls control airflow through the plenum by adjusting positions of the louvers of the louver assembly.

14. The flameless heater of claim 13, wherein the setpoint discharge air temperature comprises a first setpoint temperature that cannot be altered by an operator in the field.

15. The nameless heater of claim 13, wherein the heater can operate in at least two output modes, and where the setpoint discharge air temperature includes first and second setpoint temperatures each of which is predetermined for a respective output mode but which cannot be altered by the operator in the field.

16. The nameless heater of claim 13, wherein the setpoint discharge air temperature is selectable by an operator in the field.

17. The flameless heater of claim 13, wherein the controls are configured to control a position of the louvers to a designated, variable, setpoint.

18. The flameless heater of claim 13, wherein the controls are configured to control engine RPM to a designated, variable, setpoint.

19. The flameless heater of claim 18, wherein the setpoint for the engine RPM is dependent upon the setpoint discharge air temperature.

20. A method of controlling a nameless heater that includes a diesel engine, a flameless heat source that is powered by the engine, a plenum having an ambient air inlet and a heated air outlet, and a heater that is coupled to the heat source and that heats air flowing through the plenum, the method comprising:
   controlling the engine, the heat source, and airflow through the plenum so as to maintain the engine at or above 35% of a maximum load for the engine for at least 75% of operation time, post warm up, so as to avoid the need for parked regeneration to avoid soot buildup.

21. The method as recited in claim 20, wherein the heat source comprises a hydraulic heat source including first and second restrictors through which pressurized hydraulic fluid can be selectively forced to generate heat, and wherein the controlling step includes selectively directing hydraulic fluid flow through 1) the first restrictor but not the second restrictor, and 2) both the first and second restrictors.

22. The method of claim 20, further comprising controlling the heat source, the engine, and airflow through the plenum to maintain a setpoint engine speed and a setpoint discharge air temperature.

23. The method of claim 22, wherein the engine speed is between 2200 RPM and 2600 RPM and the air discharge temperature is between 170° F. (77° C.) and 190° F. (88° C.).

24. The method of claim 22, wherein the engine speed is between 1700 RPM and 1900 RPM and the air discharge temperature is between 90° F. (32° C.) and 110° F. (43° C.).

25. The method of claim 20, further comprising operating the flameless heater in at least one of:
   a. a first mode in which the setpoint discharge air temperature is maintained at a first temperature that cannot be altered by an operator in the field,
   b. a second mode in which the setpoint discharge air temperature is maintained at a second temperature that is substantially lower than the first temperature and that cannot be altered by an operator in the field, and
   c. a third mode in which the setpoint discharge air temperature is maintained at a temperature that is selected by an operator in the field.

26. The method of claim 20, wherein, during the controlling step, the flameless heater exhibits a maximum heat rise in excess of 150° F. (65° C.).

* * * * *

UNITED STATES PATENT AND TRADEMARK OFFICE
CERTIFICATE OF CORRECTION

PATENT NO. : 10,145,586 B2
APPLICATION NO. : 15/000166
DATED : December 4, 2018
INVENTOR(S) : Mencel et al.

Page 1 of 1

It is certified that error appears in the above-identified patent and that said Letters Patent is hereby corrected as shown below:

In the Claims

| | |
|---|---|
| Claim 11, Line 5<br>Column 13, Line 25 | Replace "a-hydraulic" with "hydraulic" |
| Claim 12, Line 1<br>Column 13, Line 28 | Replace "nameless" with "flameless" |
| Claim 15, Line 1<br>Column 13, Line 50 | Replace "nameless" with "flameless" |
| Claim 16, Line 1<br>Column 14, Line 1 | Replace "nameless" with "flameless" |
| Claim 20, Line 1<br>Column 14, Line 13 | Replace "nameless" with "flameless" |

Signed and Sealed this
Nineteenth Day of February, 2019

Andrei Iancu
*Director of the United States Patent and Trademark Office*